March 17, 1925.  L. W. BARKER  1,529,647
AUTOMOBILE BODY
Filed Feb. 16, 1924
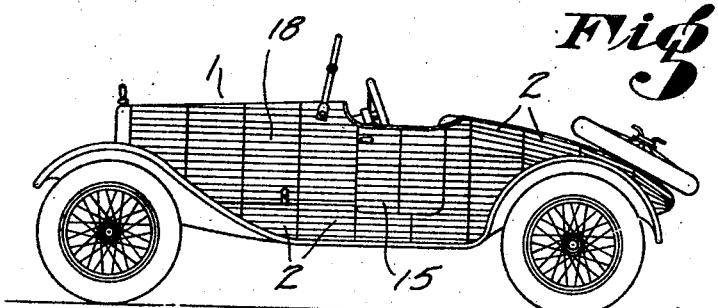
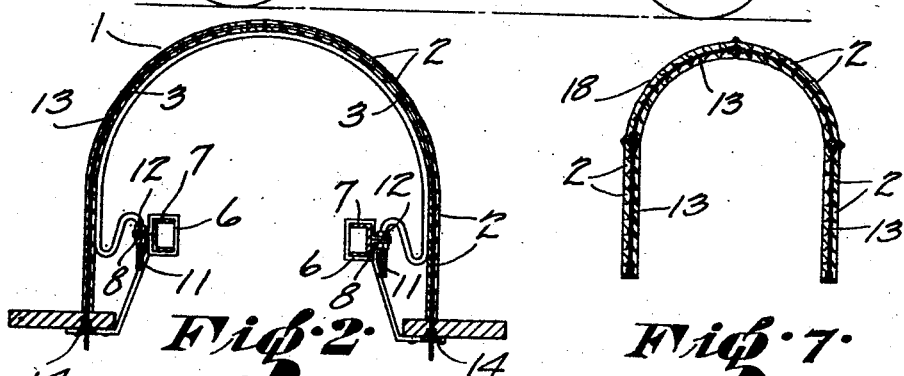
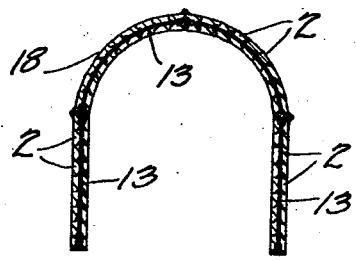
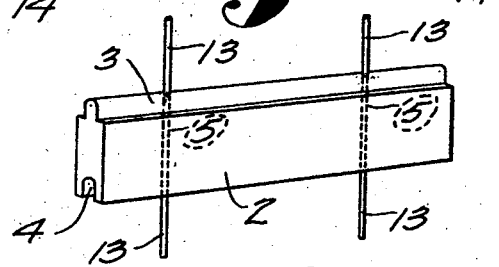
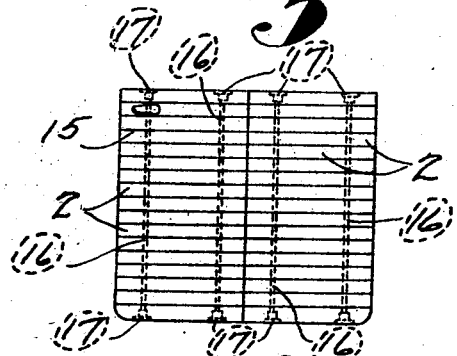
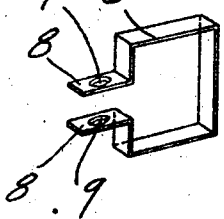
Inventor
Lee W. Barker
By Adam E. Fisher
Attorney Patented Mar. 17, 1925.

1,529,647

UNITED STATES PATENT OFFICE.

LEE W. BARKER, OF GOODING, IDAHO.

AUTOMOBILE BODY.

Application filed February 16, 1924. Serial No. 693,169.

*To all whom it may concern:*

Be it known that LEE W. BARKER, a citizen of the United States, residing at Gooding, in the county of Gooding and State of Idaho, has invented certain new and useful Improvements in Automobile Bodies, of which the following is a specification.

This invention pertains to automobile bodies, and the object of the invention is to provide a slatted form of construction for such bodies whereby if one or more ribs become broken they may be readily replaced, and the integrity of the body as a whole restored in a comparatively economical manner. Other objects and advantages of this construction will appear in the course of the following specification.

In the drawing—

Figure 1 is a side elevation of an automobile body constructed in accordance with this principle;

Figure 2 is a transverse section;

Figure 3 is a detail of one of the slats with steel binding wires inserted therethrough;

Figure 4 is a detail of a stabilizing loop for locking the slats and body in place;

Figure 5 is a detail of an anchor loop bracket for fastening the ends of the stabilizing loops to the chassis frame;

Figure 6 is a detail of one of the doors constructed in accordance with my improvement;

Figure 7 is a transverse section of the hood constructed in accordance with my improvement.

The invention consists in constructing an automobile body 1 of wooden ribs 2 which may be tongued and grooved as shown at 3 and 4 for nicely fitting together. These ribs are pierced with a plurality of equi-spaced bores 5 which extend through the ribs transversely and edgewise, and so that the bores run parallel to the sides of the ribs and are adapted to align with each other as the body is built up. In building up the body, steel binding wires 13 are provided and threaded at each end. The ends of these wires are passed through the running board on one side of the car where they are secured by threaded nipples 14. The ribs 2 are then mounted one after another upon these wires by threading the wires through the bores 5 and forcing the ribs tightly down one against the other. The opposite ends of the wires are then passed through the running board upon the opposite side of the car and are there drawn tight and secured by nipples 14. Brackets 6 are provided and mounted along the frame 7 on each side of the car, a pair of brackets being positioned under each of the wires 13. The parted ends of these brackets are extended in the form of jaws 8 having aligned bolt holes 9 therethrough. Stabilizing loops 10 are provided having threaded shanks or ends 11 for insertion through the bolt holes 9 and are adjustably secured in place by means of nuts 12 above and below the jaws 8. The loops 10 thus mounted in place are forced up against the under sides of the ribs 2 by manipulation of the nuts 12 and serve to stabilize the structure and hold it in place. The doors 15 are similarly built up of the ribs 2 and are secured together by short wires 16 which are passed through the ribs in manner similar to the body of the car, and are fastened with nipples 17 at each end. The hood 18 is similarly constructed of ribs 2 having their edges beveled as required to impart the desired curve and strung together by wires in the same manner as the doors. The sides of the hood are then hinged to the upper portion in usual manner.

It is evident that this form of construction enables the building of bodies to suit various tastes in design and finish, and also that should a portion of the body be broken it may be readily replaced.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. The described method of constructing an automobile body, consisting in building the body of individual ribs strung together by means of wires and then locking the ends of the wires to the running boards at each side, and bracing the body so formed from the under side by means of stabilizers.

2. An automobile body consisting of superimposed wooden ribs; binding wires passed through the ribs to lock same together, the ends of the wires being secured to the running boards; and inner stabilizing loops adjustably secured to the frame of the automobile and braced up against the ribs.

In testimony whereof I affix my signature.

LEE W. BARKER.

Witnesses:
G. S. MADDUX,
A. W. MILLER.